(12) United States Patent
Carey et al.

(10) Patent No.: US 8,365,893 B2
(45) Date of Patent: Feb. 5, 2013

(54) DUAL CLUTCH

(75) Inventors: Clinton E. Carey, Highland, MI (US); James M. Hart, Belleville, MI (US); Elizabeth I. Wooden, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 229 days.

(21) Appl. No.: 12/884,467

(22) Filed: Sep. 17, 2010

(65) Prior Publication Data

US 2011/0079481 A1  Apr. 7, 2011

Related U.S. Application Data

(60) Provisional application No. 61/248,283, filed on Oct. 2, 2009.

(51) Int. Cl.
*F16D 25/10* (2006.01)
*B60K 17/02* (2006.01)

(52) U.S. Cl. ............... 192/48.603; 192/110 B

(58) Field of Classification Search ............. 192/48.603, 192/48.619
See application file for complete search history.

(56) References Cited

U.S. PATENT DOCUMENTS

| 7,322,455 B2 * | 1/2008 | Vetter et al. | 192/48.9 |
| 7,392,890 B2 * | 7/2008 | Agner | 192/48.8 |
| 2011/0048887 A1 * | 3/2011 | Diemer et al. | 192/48.618 |

* cited by examiner

*Primary Examiner* — Richard M. Lorence

(57) ABSTRACT

A dual clutch selectively transmits torque from a flywheel to a dual input transmission. The transmission has two input shafts a first shaft and a second shaft that is a hollow sleeve shaft. The second shaft is concentric with the first shaft. The dual clutch has two clutch units to selectively couple a crankshaft of an engine to one of the two input shafts. More specifically, the dual clutch includes members such as a clutch housing rotationally fixed to the crankshaft through a flywheel and other members such hubs that are rotationally fixed to the input shafts. The clutches are actuated by a rotationally fixed clutch actuator. Axial loads on the clutches are transferred through a bearing to a fixed member.

18 Claims, 4 Drawing Sheets

DUAL CLUTCH

CROSS-REFERENCE TO RELATED APPLICATIONS

This application claims the benefit of U.S. Provisional Application No. 61/248,283, filed on Oct. 2, 2009, which is hereby incorporated in its entirety herein by reference.

TECHNICAL FIELD

The present disclosure relates to transmissions and more particularly to a dual clutch for a compact, dual input multiple speed transmission.

BACKGROUND

The statements in this section merely provide background information related to the present disclosure and may or may not constitute prior art.

A typical dual input multiple speed transmission has a first input shaft and a second input shaft that is a hollow sleeve shaft that is concentric with the first input shaft. The first and second input shafts are selectively coupled to the engine crankshaft through a dual clutch. The dual or twin clutch has two independent clutch units that are each separately rotationally fixed to one of the input shafts. The clutch units include friction elements that are axially compressed against friction elements that are ultimately rotationally fixed to the crankshaft. A dual clutch actuation device generates the apply force necessary to axially compress the friction elements and rotationally couple the input shafts with the crankshaft.

While current dual clutches achieve their intended purpose, the need for new and improved configurations which exhibit improved performance, especially from the standpoints of efficiency, responsiveness and smoothness and improved packaging, primarily reduced size and weight, is essentially constant. Accordingly, there is a need in the art for a transmission having improved packaging while providing desirable gear ratios and torque ranges.

SUMMARY

The present invention provides a dual clutch for a dual input transmission. The transmission has two input shafts a first shaft and a second shaft that is a hollow sleeve shaft. The second shaft is concentric with the first shaft. A dual clutch having two clutch units selectively couples a crankshaft of an engine to one of the two input shafts. More specifically, the dual clutch includes members such as a clutch housing rotationally fixed to the crankshaft through a flywheel and other members such as hubs that are rotationally fixed to the input shafts. The clutch housing has a first set of frictional members attached thereto and the hubs have a second set of frictional members. The first and second frictional members are axially compressed against each other to couple one of the hubs to the dual clutch housing/hub, thereby transmitting torque from the crankshaft to one of the input shafts.

A dual clutch actuation device is provided to generate the axial compression force required to compress the first and second set of frictional elements. Dual clutch actuation device includes a first and second annular piston. The annular pistons include a first end that is in contact with annular bearing assemblies. The annular bearing assemblies are in contact with actuation disks that are in contact with the first set of frictional elements. The annular pistons are arranged in concentric annular piston slots. Together the piston and annular slots form annular piston chambers. The piston chambers are filled with hydraulic fluid. When the hydraulic fluid is pressurized the pistons slide out of the annular slots and apply a force on the actuation disks which in turn apply an axial compression force on the frictional elements.

In another aspect of the present invention, the dual clutch includes a pair of return springs that apply a return force to the actuation disks.

In another aspect of the present invention, the dual clutch includes a support bearing for receiving axial and radial loads from the clutch housing or hub.

The above features and advantages and other features and advantages of the present invention are readily apparent from the following detailed description of the best modes for carrying out the invention when taken in connection with the accompanying drawings.

DESCRIPTION

Figure 1A:
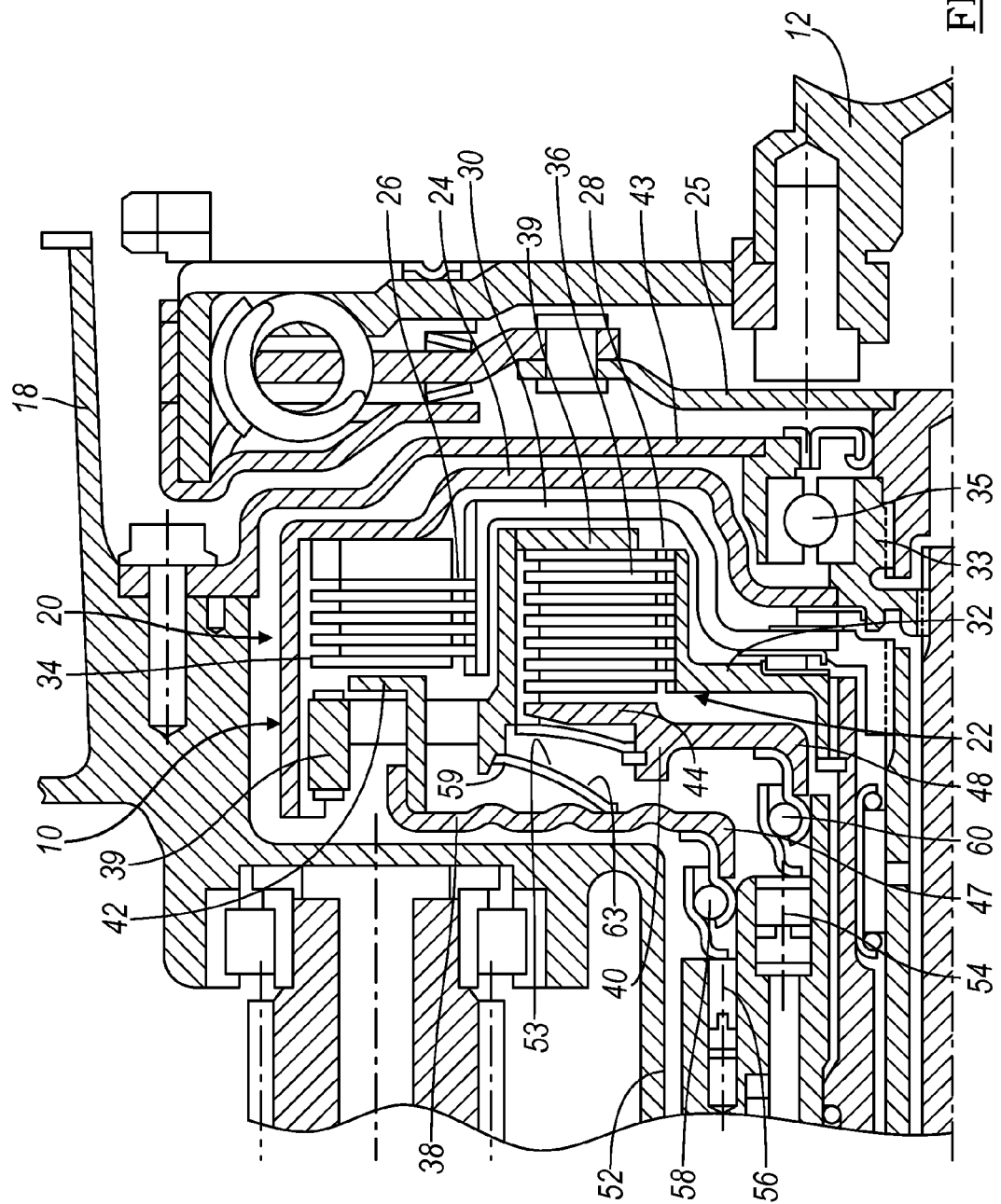
FIGS. 1A and 1B are a partial cross-sectional view of a torque transmitting device for a dual input transmission, in accordance with an embodiment of the present invention.
Figure 1B:
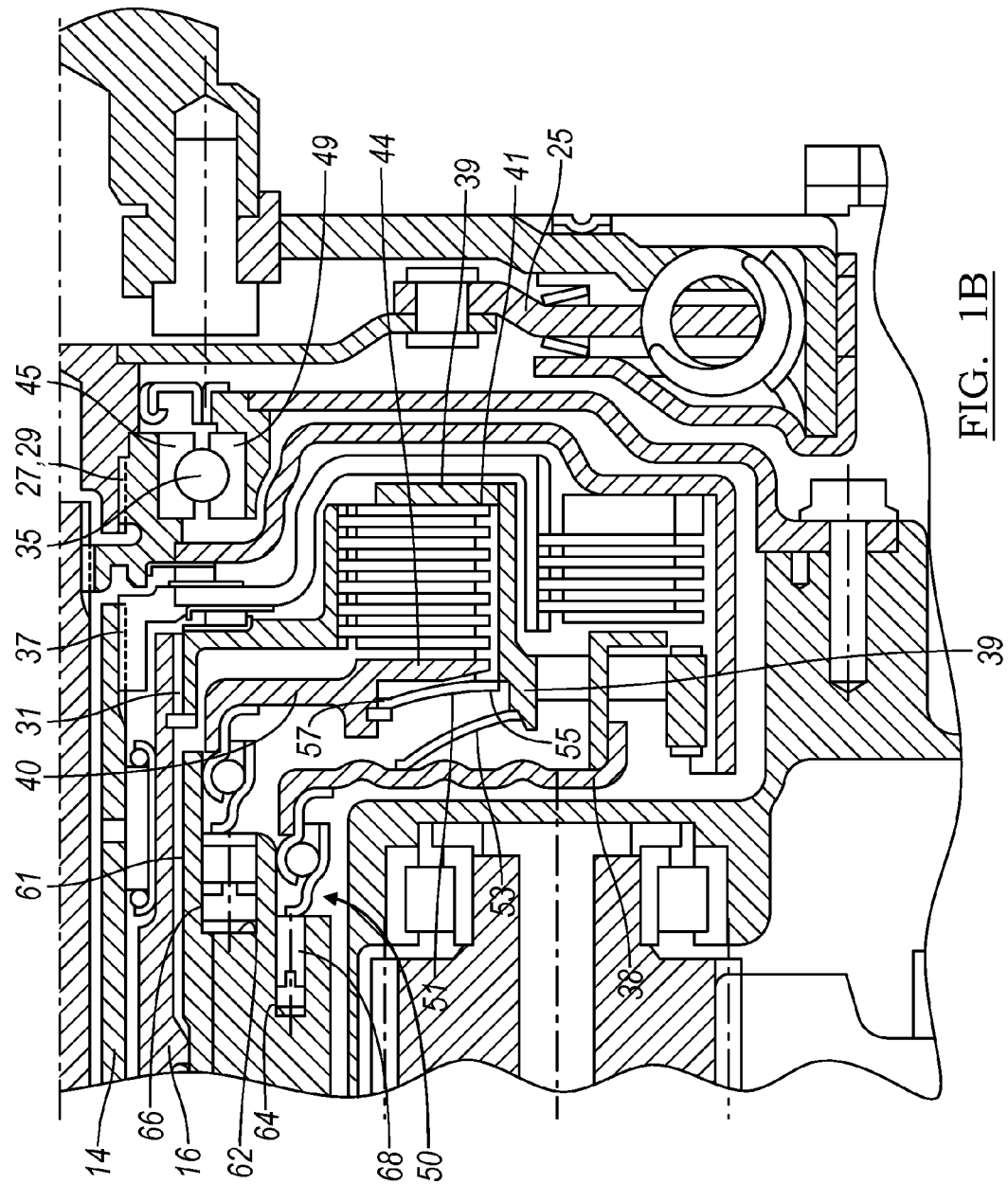
Figure 2A:
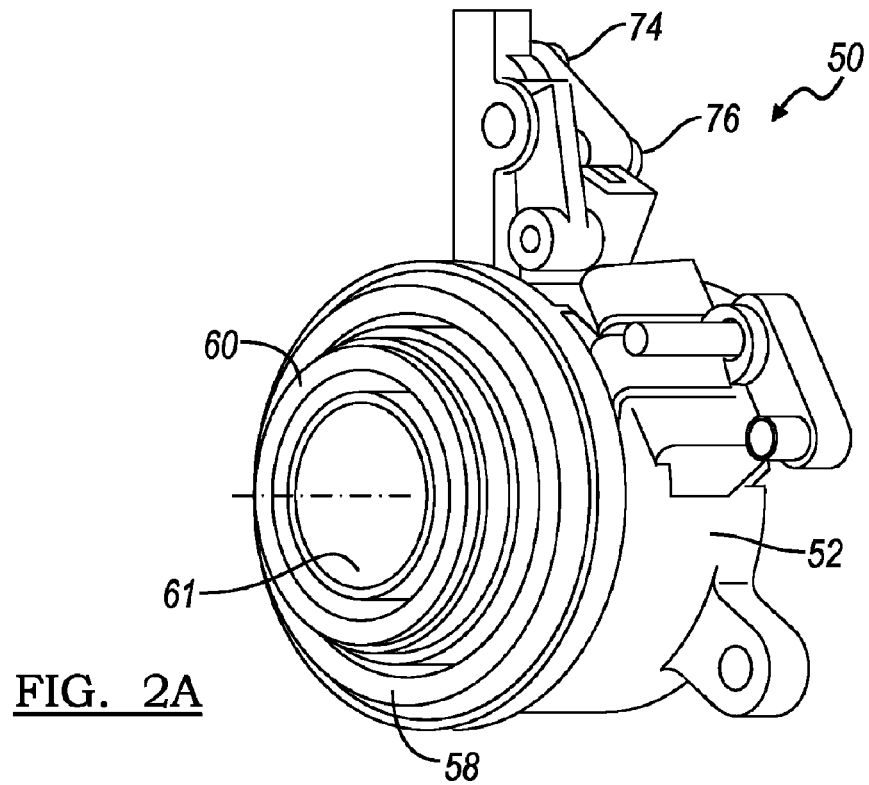
FIG. 2A is a perspective view of front side of an actuation device for activating the torque transmitting device of FIG. 1, in accordance with an embodiment of the present invention.
Figure 2B:
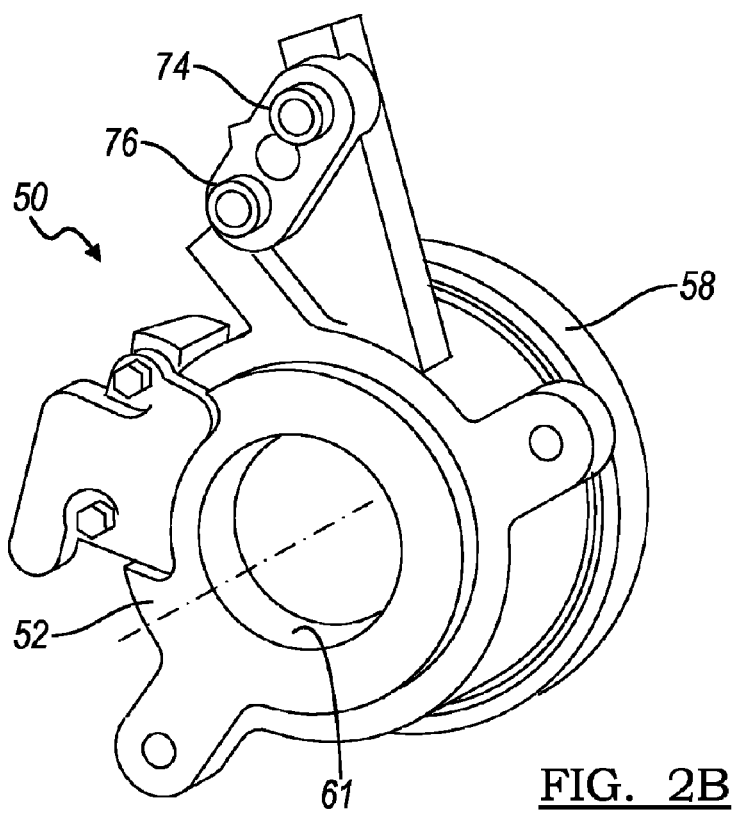
FIG. 2B is a perspective view of back side an actuation device for activating the torque transmitting device of FIG. 1, in accordance with an embodiment of the present invention.
Figure 3:
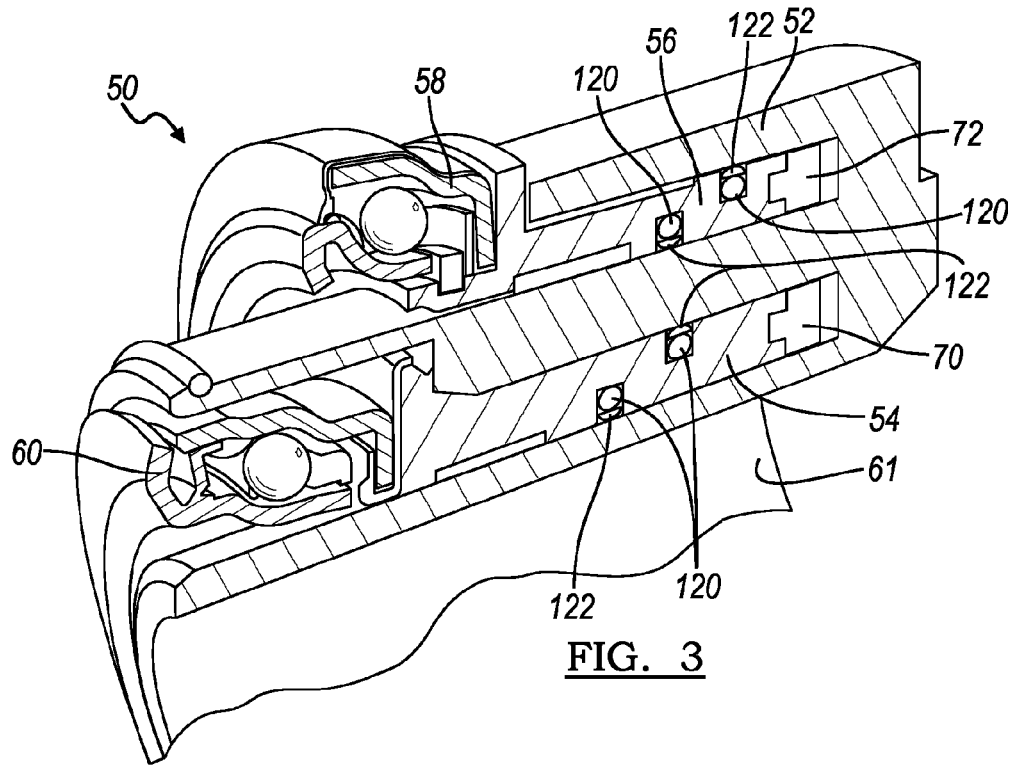
FIG. 3 is a partial cross-sectional view of the actuation device of FIGS. 2A and 2B, in accordance with an embodiment of the present invention.
Figure 4:
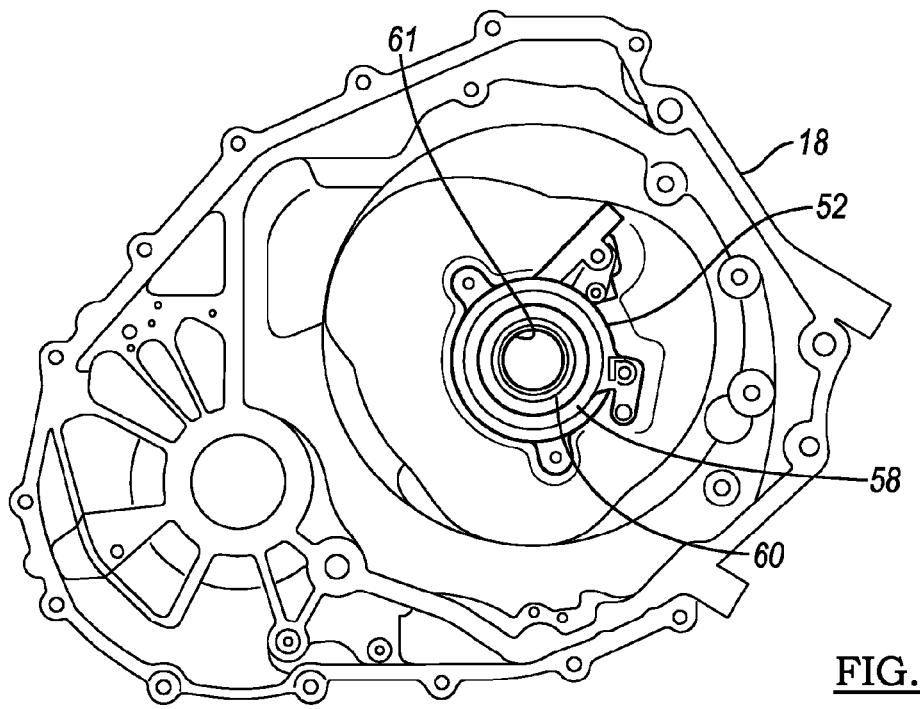
FIG. 4 is a front view of the actuation device of FIGS. 2A and 2B attached to a wall of the housing of a transmission, in accordance with an embodiment of the present invention.

Referring to FIG. 1, a partial cross-sectional view of a torque transmitting device for a dual input transmission (not shown) is generally indicated by reference number 10. The torque transmitting device 10 is for example a dual clutch disposed in a vehicle powertrain. Typically the vehicle powertrain includes an engine and a transmission. In the instant embodiment the transmission is a dual input transmission where torque is transferred from the engine via a crankshaft 12 to two input shafts in the transmission: a first input shaft 14 and a second input shaft 16 through selective operation of torque transmitting device 10. The second input shaft 16 is a sleeve (or hollow) shaft that is concentric with and overlies the first input shaft 14. Torque transmitting device 10 is disposed in a transmission housing or bell housing 18

Torque transmitting device 10 has two separate and independent friction clutches 20 and 22 disposed within a clutch housing or outer hub 24. Clutch housing or outer hub 24 is rotationally fixed to a flywheel 25 through a plurality of splines 27 on flywheel 25 and cooperating grooves 29 on hub 24. Flywheel 25 is rotationally fixed to crankshaft 12 and is preferably a dual mass flywheel that is configured to dampen and reduce vibration in the crankshaft 12.

Friction clutches 20 and 22 each include friction members 26 and 28, respectively. Friction members 26 and 28 are fixed to hub members 30 and 32, respectively. Hub members 30 and 32 are each rotationally fixed to first and second input shafts 14 and 16, respectively, through a spline/groove engagement 37, 31.

Moreover, a plurality of friction members 34 and 36 are attached and rotationally fixed to housing or hub 24. More specifically, friction members 34 include slots that receive corresponding projections extending from hub 24 to rotationally engage friction members with hub 24. Additionally, hub 24 has a hub extension disk 39 rotationally fixed for common rotation to hub 24 such that an outer surface of hub extension disk 39 is attached to an inside surface of hub 24. Hub extension disk 39 further includes an inner surface 41 that has a plurality of projection that cooperatively engage a plurality of slots in friction members 36 to rotationally fix for common rotation friction members 36 with hub extension disk 39. The slot/projection radial engagement of friction members 34 with hub 24 and friction members 36 with hub extension 39 allows friction members 34, 36 to translate axially on hub 24 and hub extension 39.

Friction members 26 and 28 and friction members 34 and 36 are configured to form a friction clutch, as is known in the art as a dual clutch. Thus, selective engagement through axial compression of friction members 26 with friction members 34 connects the crankshaft 12 for common rotation with the first input shaft 14. Selective engagement of friction member 28 with friction element 36 connects the crankshaft 12 for common rotation with the second input shaft 16. Friction clutches 20 and 22 may include multiple friction members 26 and 28 that interact with a respective multiple of friction members 34 and 36 connected to housing 24. The number and size of the friction members will vary based on appropriate torque transmission requirements. Of course, the torque transmission capability of device 10 may be varied by varying the number of friction members and amount of surface area of each friction element.

The coupling of the crankshaft 12 to the input shafts 14 and 16 is achieved through axial compression of the friction members 34 and 36 by actuation disks 38 and 40. Actuation disk 38 has a first end 42 that is configured to compress friction members 26 and 34. Actuation disk 38 further includes a second end 47 in contact with and configured to receive an apply force generated by an actuation device 50. Actuation disk 40 has a first end 44 that is configured to compress friction members 28 and 36. Actuation disk 40 further includes a second end 48 in contact with and configured to receive an apply force generated by an actuation device 50.

A bearing 35 is supported by a clutch cover 43 that is rigidly attached to bell housing 18 by fasteners such as bolts or the like. Accordingly, clutch cover 43 is constrained from rotating relative to bell housing 18. Clutch housing or hub 24 is connected for common rotation with a center shaft 33. Center shaft 33 is supported for rotation by bearing 35. Moreover, bearing 35 has an inner race 45 fixed to center shaft 33 and an outer race 49 fixed to clutch cover 43. As conventionally known, a plurality of ball bearings are disposed between races 45, 49 to provide rotational decoupling of the race 45 from race 49. Bearing 35 is preferably an angular contact bearing or similar device that can withstand radial as well as axial loads. The radial and axial loads transferred to bearing 35 from the operation of torque transmitting device 10 are transmitted to clutch cover 43 and then onto housing 18.

Torque transmitting device 10 further includes inner and outer return springs 51, 53. Inner and outer return springs 51, 53 are Bellville springs or similar type springs that apply a return force to the actuation disks 38 and 40 to decompress the fiction members 26 and 34 and 28 and 36 allowing hubs 30, 32 to rotate relative to housing 24. More specifically, inner return spring 51 is in contact at first end 55 with the extension disk 39 and at a second end 57 with actuation disk 40. Similarly, outer return spring 53 is in contact at first end 59 with the extension disk 39 and at a second end 63 with actuation disk 38.

Referring now to FIGS. 1 through 4, actuation device 50 is described in further detail, in accordance with the present invention. Actuation device 50 includes an annular housing 52, a pair of annular pistons 54 and 56 and a pair of bearing assemblies 58 and 60. Housing 52 is mounted to bell housing 18 and thus is rotationally fixed to bell housing 18 and defines a central bore 61, a pair of annular slots 62 and 64. The central bore 61 is sized to allow the first input shaft 14 and the second input shaft 16 to pass there through. Annular slot 62 is concentric with and disposed radially inward of annular slot 64. The annular pistons 54 and 56 are configured to slide axially within the slots and form piston chambers 66 and 68 therewith. Annular pistons 54 and 56 further include seals 70 and 72, respectively, fixed to an end of pistons 54 and 56. Seals 70 and 72 are configured to prevent excessive leakage of hydraulic fluid between a wall of the piston chambers 66 and 68 and the ends of the pistons. Piston chambers 66 and 68 are filled with hydraulic fluid through clutch feed bores 74 and 76. Bearing assemblies 58 and 60 are actuation bearings that torsionally decouple the rotating elements of clutch 10 (i.e. housing 24 and actuation disks 38 and 40) from the nonrotating members of the actuation device 50 (i.e. pistons 54 and 56).

In operation hydraulic fluid is pressurized and forced through clutch feed bores 74 and 76 to push pistons 54 and 56 out of their respective piston chambers 66 and 68 towards clutch 10. More specifically, pressurized hydraulic fluid is pushed through clutch feed bore 76 into piston chamber 68 forcing annular piston 56 to slide out of the chamber towards clutch 10. As annular piston 56 moves out of the chamber, bearing assembly 58 which is in contact with annular piston 56 applies a force to one end of the actuation disk 38. Actuation disk 38 in turn compresses friction members 34 axially against friction member 26 causing friction member 26 to rotate at substantially the same speed as friction element 34. Thus, crankshaft 12 is selectively rotationally coupled with first input shaft 14. When chamber 68 is depressurized or vented the force applied by return spring 53 on actuation disk 38 forces piston 56 back into chamber 68.

Similarly, pressurized hydraulic fluid is pushed through clutch feed bore 74 into chamber 66 forcing annular piston 54 to slide out of the chamber towards clutch 10. As annular piston 54 moves out of the chamber bearing assembly 60 which is in contact with annular piston 54 applies a force to one end of the actuation disk 40. Actuation disk 40 in turn compresses friction element 36 axially against friction member 28 causing friction member 28 to rotate at substantially the same speed as friction element 36. Thus, crankshaft 12 is selectively rotationally coupled with second input shaft 16. When chamber 66 is depressurized or vented the force applied by return spring 51 on actuation disk 40 forces piston 54 back into chamber 66.

The present invention has many advantages and benefits over the prior art. For example, the clutch 10 is configured to transmit axial loading of the clutch housing or hub 24 during clutch actuation through support bearing 35 to clutch cover 43. Thus, a more robust clutch operation is achieved.

While the best modes for carrying out the invention have been described in detail, those familiar with the art to which this invention relates will recognize various alternative designs and embodiments for practicing the invention within the scope of the appended claims.

The following is claimed:

1. A dual clutch in a transmission comprising:
   a rotationally fixed member;
   a center shaft;

a clutch housing that defines a rotational axis, the clutch housing disposed within the rotationally fixed member and directly connected to the center shaft;

a first hub disposed radially inwardly of the clutch housing;

a second hub disposed radially inwardly of the first hub;

a first clutch pack configured to selectively rotationally couple the clutch housing with the first hub when the first clutch pack is engaged;

a second clutch pack configured to selectively rotationally couple the clutch housing with the second hub when the second clutch pack is engaged;

a clutch actuation assembly connected to the rotationally fixed member, the clutch actuation assembly configured to selectively cause the first clutch pack and the second clutch pack to engage; and a bearing having inner and outer races, wherein the inner race is directly connected to the center shaft and the outer race is interconnected to the rotationally fixed member, wherein the bearing is configured to transmit axial loading of the clutch housing during engagement of the first or second clutch pack through the bearing to the rotationally fixed member.

2. The dual clutch of claim 1 wherein the rotationally fixed member includes a transmission case and a radially extending support member connected at a first end thereof to the transmission case, and wherein the outer race of the bearing is fixed to a second end of the support member located radially opposite the first end.

3. The dual clutch of claim 1 wherein the clutch housing includes a radially inwardly extending member, and the second clutch pack is interconnected with the radially inwardly extending member.

4. The dual clutch of claim 1 wherein the first clutch pack is concentric with the second clutch pack.

5. The dual clutch of claim 1 wherein the clutch actuation assembly comprises:

a housing fixedly secured to the rotationally fixed member and defining first and second annular slots;

a first annular piston at least partially slidably disposed in the first annular slot;

a second annular piston at least partially slidably disposed in the second annular slot;

a first annular piston chamber defined by the first annular slot and the first annular piston, wherein the first annular piston chamber is filled with a hydraulic fluid;

a second annular piston chamber defined by the second annular slot and the second annular piston, wherein the second annular piston chamber is filled with the hydraulic fluid;

a first annular bearing assembly having a first race in contact with the first annular piston and a second race in communication with one of the first and second clutch pack; and a second annular bearing assembly having a first race in contact with the second annular piston and a second race in communication with the other of the first and second clutch pack, and wherein the first and second clutch packs are engaged by independently pressurizing the hydraulic fluid in at least one of the first and second annular piston chambers forcing at least one of the first and second annular pistons to slide out of the first and second annular slots.

6. The dual clutch of claim 5 further comprising first and second apply discs, wherein the first apply disc is in contact with the second race of the first annular bearing and in contact with the first clutch pack when the first clutch pack is engaged, and wherein the second apply disc is in contact with the second race of the second annular bearing and in contact with the second clutch pack when the second clutch pack is engaged.

7. The dual clutch of claim 1 wherein the first and second clutch packs each include reaction plates interleaved with friction discs, wherein the reaction plates of the first clutch pack are slidingly connected to one of the clutch housing and the first hub and the friction discs of the first clutch pack are slidingly connected to the other of the clutch housing and the first hub, and wherein the reaction plates of the second clutch pack are slidingly connected to one of the clutch housing and the second hub and the friction discs of the second clutch pack are slidingly connected to the other of the clutch housing and the second hub.

8. The dual clutch of claim 1 wherein the bearing is located axially forward of the clutch actuation assembly and disposed between an end of the clutch housing and an end of the rotationally fixed member.

9. The dual clutch of claim 1 wherein the bearing is an axial thrust bearing.

10. An apparatus comprising:

an input shaft;

a case;

a radially inwardly extending support member having a first end and a second end located radially inward of the first end, wherein the first end is connected to the case;

a center shaft directly connected to the input shaft;

a clutch housing that defines a rotational axis, the clutch housing disposed within the case and directly connected to the center shaft;

a first hub disposed radially inwardly of the clutch housing;

a second hub disposed radially inwardly of the first hub;

a first clutch pack configured to selectively rotationally couple the clutch housing with the first hub when the first clutch pack is engaged;

a second clutch pack configured to selectively rotationally couple the clutch housing with the second hub when the second clutch pack is engaged;

a clutch actuation assembly connected to the case, the clutch actuation assembly configured to selectively engage the first clutch pack and the second clutch pack; and an axial thrust bearing having inner and outer races, wherein the inner race is directly connected to the center shaft and the outer race is interconnected to the second end of the support member, wherein the axial thrust bearing is configured to transmit axial loading of the clutch housing during engagement of the first or second clutch pack through the axial thrust bearing to the case via the support member.

11. The dual clutch of claim 10 wherein the clutch housing includes a radially inwardly extending member, and the second clutch pack is interconnected with the radially inwardly extending member.

12. The dual clutch of claim 10 wherein the first clutch pack is concentric with the second clutch pack.

13. The dual clutch of claim 10 wherein the clutch actuation assembly comprises:

a housing fixedly secured to the rotationally fixed member and defining first and second annular slots;

a first annular piston at least partially slidably disposed in the first annular slot;

a second annular piston at least partially slidably disposed in the second annular slot;

a first annular piston chamber defined by the first annular slot and the first annular piston, wherein the first annular piston chamber is filled with a hydraulic fluid;

a second annular piston chamber defined by the second annular slot and the second annular piston, wherein the second annular piston chamber is filled with the hydraulic fluid;

a first annular bearing assembly having a first race in contact with the first annular piston and a second race in communication with one of the first and second clutch pack; and a second annular bearing assembly having a first race in contact with the second annular piston and a second race in communication with the other of the first and second clutch pack, and wherein the first and second clutch packs are engaged by independently pressurizing the hydraulic fluid in at least one of the first and second annular piston chambers forcing at least one of the first and second annular pistons to slide out of the first and second annular slots.

14. The dual clutch of claim 13 further comprising first and second apply discs, wherein the first apply disc is in contact with the second race of the first annular bearing and in contact with the first clutch pack when the first clutch pack is engaged, and wherein the second apply disc is in contact with the second race of the second annular bearing and in contact with the second clutch pack when the second clutch pack is engaged.

15. The dual clutch of claim 14 wherein the axial loading is exerted on the first and second clutch packs by contact of the first and second apply discs during engagement of the first and second clutches.

16. The dual clutch of claim 10 wherein the first and second clutch packs each include reaction plates interleaved with friction discs, wherein the reaction plates of the first clutch pack are slidingly connected to one of the clutch housing and the first hub and the friction discs of the first clutch pack are slidingly connected to the other of the clutch housing and the first hub, and wherein the reaction plates of the second clutch pack are slidingly connected to one of the clutch housing and the second hub and the friction discs of the second clutch pack are slidingly connected to the other of the clutch housing and the second hub.

17. The dual clutch of claim 10 wherein the axial thrust bearing is located axially forward of the clutch actuation assembly.

18. The dual clutch of claim 10 wherein the axial thrust bearing is disposed between an end of the clutch housing and an end of the support member in substantial axial alignment with the clutch actuation assembly.

* * * * *